(12) United States Patent
Li et al.

(10) Patent No.: US 12,191,474 B2
(45) Date of Patent: Jan. 7, 2025

(54) ASYNCHRONOUS HEATING AND CALENDERING DEVICE, LARGE WIDE ULTRA-THIN LITHIUM METAL FOIL, PREPARATION METHOD THEREFOR, AND APPLICATION THEREOF

(71) Applicant: BEIJING WELION NEW ENERGY TECHNOLOGY CO., LTD, Beijing (CN)

(72) Inventors: Wenjun Li, Beijing (CN); Yongwei Li, Beijing (CN); Jin Xiang, Beijing (CN); Huigen Yu, Beijing (CN); Yafei He, Beijing (CN); Baopeng Hou, Beijing (CN)

(73) Assignee: BEIJING WELION NEW ENERGY TECHNOLOGY CO., LTD, Beijing (CN)

( * ) Notice: Subject to any disclaimer, the term of this patent is extended or adjusted under 35 U.S.C. 154(b) by 70 days.

(21) Appl. No.: 17/763,357

(22) PCT Filed: Sep. 22, 2020

(86) PCT No.: PCT/CN2020/116658
§ 371 (c)(1),
(2) Date: Mar. 24, 2022

(87) PCT Pub. No.: WO2021/057688
PCT Pub. Date: Apr. 1, 2021

(65) Prior Publication Data
US 2022/0352491 A1    Nov. 3, 2022

(30) Foreign Application Priority Data
Sep. 25, 2019    (CN) .......................... 201910911287.6

(51) Int. Cl.
*B21B 1/40* (2006.01)
*B21B 3/00* (2006.01)
(Continued)

(52) U.S. Cl.
CPC ............. *H01M 4/0435* (2013.01); *B21B 1/40* (2013.01); *B21B 3/00* (2013.01); *B21D 13/045* (2013.01);
(Continued)

(58) Field of Classification Search
CPC ..... B21B 1/40; B21B 3/00; B21B 2001/1225; H01M 4/0435
See application file for complete search history.

(56) References Cited

U.S. PATENT DOCUMENTS

| | | | |
|---|---|---|---|
| 5,759,141 A * | 6/1998 | Schmitz | F16C 13/003 492/40 |
| 6,171,223 B1 * | 1/2001 | Koivukunnas | D21G 1/0233 492/56 |
| 6,854,385 B1 * | 2/2005 | Vodermayer | F16C 13/00 100/155 R |

FOREIGN PATENT DOCUMENTS

| | | |
|---|---|---|
| CN | 203690404 | 7/2014 |
| CN | 204558583 | 8/2015 |

(Continued)

OTHER PUBLICATIONS

CN 207800780U, Shao et al. Aug. 2018.*
(Continued)

*Primary Examiner* — Edward T Tolan
(74) *Attorney, Agent, or Firm* — WENDEROTH, LIND & PONACK, L.L.P.

(57) ABSTRACT

Provided are an asynchronous heating and calendering device, a large wide ultra-thin lithium metal foil, and prepa-
(Continued)

ration method and use thereof, wherein the asynchronous heating and calendering device comprises: a pulling-substrate unwinding unit (E) for unwinding a pulling-substrate (P); a lithium strip unwinding unit (D) for unwinding a lithium strip (S); an asynchronous heating and calendering unit (H) which comprises: a first calendering roller (B), a second calendering roller (A) and a heating box (C), wherein the heating box (C) is used to heat the first calendering roller (B), the first calendering roller (B) heats the pulling-substrate (P), and the first calendering roller (B) and the second calendering roller (A) have parallel axes and are arranged opposite to each other, so that the pulling-substrate (P) and the lithium strip (S) are combined into a composite strip (Z); and a winding unit (G) for winding the composite strip (Z). A large wide ultra-thin lithium metal foil with a uniform thickness may be prepared by providing a heating box (C) and asynchronous first calendering roller (B) and second calendering roller (A) in said device, and the application of this lithium foil in batteries has a relatively high initial efficiency. The width of the lithium foil is 1-600 mm; the thickness of the lithium foil is 1-20 μm; and the initial efficiency of the battery reaches 98%.

6 Claims, 1 Drawing Sheet

(51) Int. Cl.
*B21D 13/04* (2006.01)
*H01M 4/04* (2006.01)
*H01M 4/134* (2010.01)
*H01M 4/1395* (2010.01)
*B21B 1/22* (2006.01)

(52) U.S. Cl.
CPC ......... *H01M 4/134* (2013.01); *H01M 4/1395* (2013.01); *B21B 2001/225* (2013.01)

(56) References Cited

FOREIGN PATENT DOCUMENTS

| | | |
|---|---|---|
| CN | 205264795 | 5/2016 |
| CN | 206471412 | 9/2017 |
| CN | 107415406 | 12/2017 |
| CN | 206742387 | 12/2017 |
| CN | 107863491 | 3/2018 |
| CN | 207459066 | 6/2018 |
| CN | 207558931 | 6/2018 |
| CN | 207806174 | 9/2018 |
| CN | 109174967 | 1/2019 |
| JP | 2008-293970 | 12/2008 |
| WO | 2016/173137 | 11/2016 |

OTHER PUBLICATIONS

International Search Report issued Dec. 23, 2020, in International (PCT) Application No. PCT/CN2020/116658, with English translation.
Extended European Search Report issued May 13, 2024 in European Patent Application No. 20867180.0.
Office Action issued Aug. 9, 2024 in Korean Application No. 10-2022-7013530, with English-language translation.

* cited by examiner

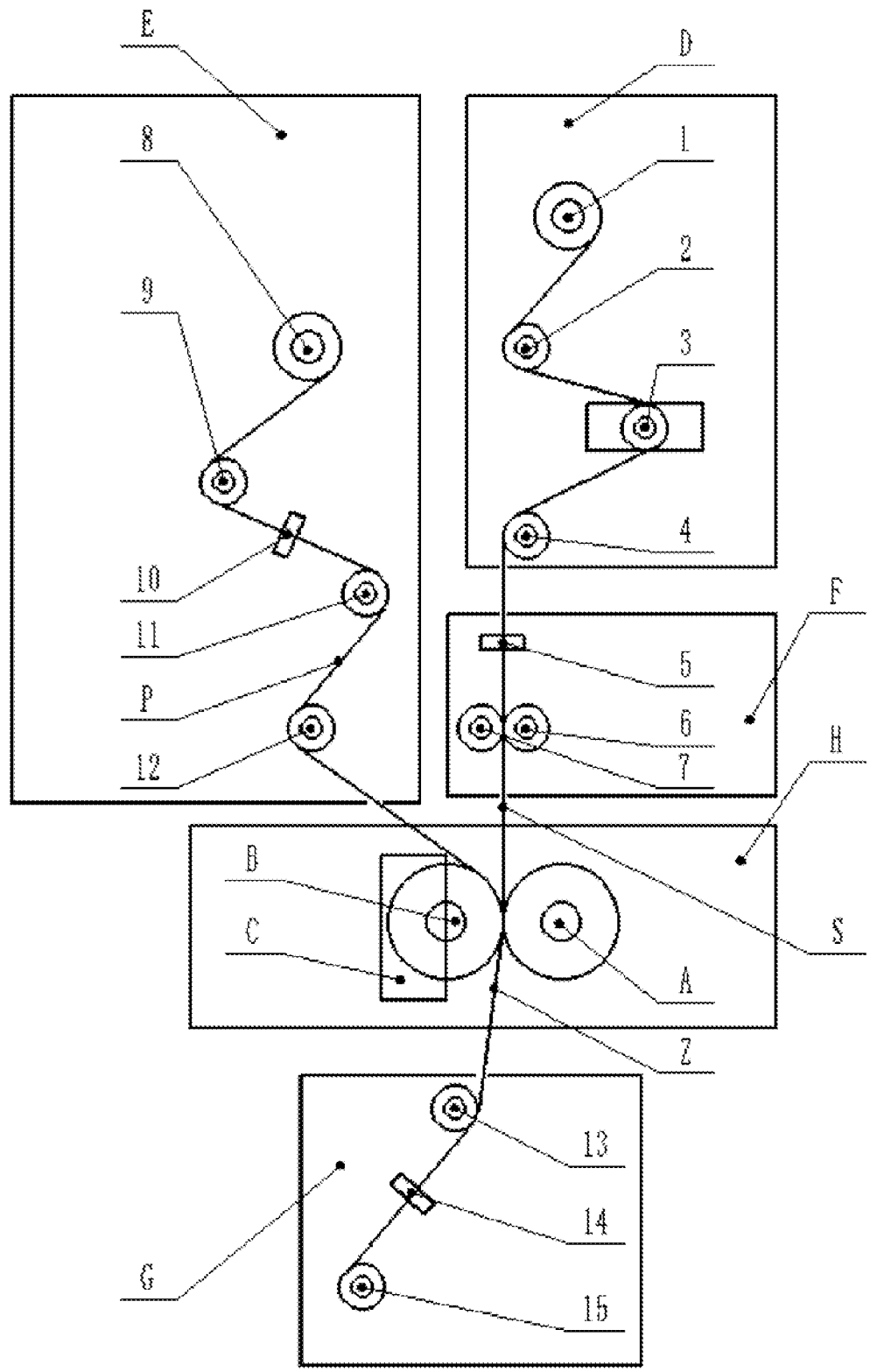

ASYNCHRONOUS HEATING AND CALENDERING DEVICE, LARGE WIDE ULTRA-THIN LITHIUM METAL FOIL, PREPARATION METHOD THEREFOR, AND APPLICATION THEREOF

This application claims the benefit of the priority of the Chinese patent application CN201910911287.6 filed with China Patent Office on Sep. 25, 2019, titled "Asynchronous Heating and Calendering Device, Large-width Ultra-thin Lithium Metal Foil, Preparation Method Therefor, and Application Thereof", which is entirely incorporated herein by reference.

TECHNICAL FIELD

The application belongs to the technical field of ultra-thin lithium foil, particularly relates to an asynchronous heating and calendering device, a large-width ultra-thin lithium metal foil, and a preparation method and application thereof.

BACKGROUND ART

Lithium-ion batteries are widely used in consumer electronics and electric vehicles due to their advantages including high energy density, long service life, and green and pollution-free. However, during the first charge and discharge process of a lithium battery, part of the lithium is consumed due to the formation of the solid electrolyte membrane (SEI film), resulting in the loss of lithium in the cathode material, and this irreversible loss of the first capacity directly leads to the loss of battery capacity. At present, the lithium-replenishing process for electrode plates of lithium-ion batteries is the key technology to improve the capacity of lithium-ion batteries, and its core lies in calendering and combination. Calendering is a process of rolling a lithium strip with a thickness of 0.25-2 mm to form a lithium film with a thickness of 0.002-0.006 mm, and making it adhere to the pulling film.

In the existing lithium-replenishing process, in the process of calendering the lithium strip, when the thickness of the lithium strip material fluctuates greatly (≥±10 μm), especially when the width of the lithium strip is large (above 150 mm), during the feeding process of the lithium strip, the tension in the width direction is uneven, usually the two sides are large and the middle is small, so that the deformation of the lithium strip in the width direction is inconsistent (the thickness is uneven, the middle is thick and the two sides are thin). Therefore, when the calendering roller is running at high speed, the fluctuation of the thickness of the lithium strip material, the inconsistency of the tension of the lithium strip in the width direction, and the uneven deformation of the lithium strip in the width direction are easy to cause the middle part of the lithium strip to accumulate at the rolling and feeding position and cause lithium accumulation; since lithium is accumulating more and more, it is difficult to eliminate, thereby seriously affecting the normal feeding of the lithium strip material, reducing the thickness consistency of the calendered lithium strip, making continuous production impossible, finally resulting in material waste and reduced production capacity. In addition, the traditional calendering has high requirements on the roller press, and the traditional simple rolling cannot realize rolling the lithium strip to a thickness of 2-6 μm. Even if it can be achieved, other auxiliary materials are required, but the auxiliary materials are expensive; this further increases the cost of lithium strips, and single-component lithium metal strips cannot completely be obtained, thereby seriously affecting the performance of the lithium metal strips.

CONTENTS OF THE INVENTION

In view of this, the object of the present application is to provide an asynchronous heating and calendering device, a large-width ultra-thin lithium metal foil and a preparation method and use thereof; and a large-width ultra-thin lithium strip with uniform thickness may be prepared by using said device.

The application provides an asynchronous heating and calendering device for preparing large-width ultra-thin lithium metal foil in a short process, which comprises: a pulling-substrate unwinding unit for unwinding a pulling-substrate;

a lithium strip unwinding unit for unwinding a lithium strip;

a lithium strip pre-shaping unit;

an asynchronous heating and calendering unit which comprises: a first calendering roller, a second calendering roller and a heating box; wherein the heating box is used to heat the first calendering roller; the first calendering roller heats the pulling-substrate, and the first calendering roller and the second calendering roller have parallel axes and are arranged opposite to each other, so that the pulling-substrate and the lithium strip are combined into a composite strip; and a winding unit for winding the composite strip.

Preferably, the surface of the second calendering roller is coated with a ceramic layer or a polymer layer; wherein the ceramic layer comprises one or more selected from the group consisting of: alumina, zirconia, chromium oxide and composite ceramic coating; and the polymer layer comprises one or more selected from the group consisting of: polysiloxane, long-chain alkane, and paraffin.

Preferably, the lithium strip unwinding unit comprises: a lithium strip unwinding roller, a first auxiliary guide roller, a first tension-detecting roller and a speed-measuring roller, which are arranged in sequence;

the pulling-substrate unwinding unit comprises: a substrate unwinding roller, a second auxiliary guide roller, a first deviation-correcting sensor, a third auxiliary guide roller and a fourth auxiliary guide roller, which are arranged in sequence;

the lithium strip pre-shaping unit comprises: a second deviation-correcting sensor and shaping rollers arranged oppositely, which are arranged in sequence; and the winding unit comprises: a second tension-detecting roller, a third deviation-correcting sensor and a composite strip winding roller, which are arranged in sequence.

Preferably, the pulling-substrate is selected from the group consisting of: stainless steel foil, copper foil, steel foil and iron foil.

The present application provides a method for preparing large-width ultra-thin lithium foil by using the asynchronous heating and calendering device according to the above technical solutions, the method comprises the following steps:

firstly unwinding and pre-shaping the lithium strip, then asynchronously heating and calendering the lithium strip together with the unwound pulling-substrate in the gap between the first calendering roller and the second calendering roller, finally winding to obtain a composite strip;

the temperature of the above treatment of asynchronous heating and calendering is 50-250° C.; the rotating speed ratio of the second calendering roller and the first calendering roller is 1:1.1-8.

Preferably, the unwinding speed of the lithium strip is 0.1-3 m/min; and the unwinding speed of the pulling-substrate is 0.1-20 m/min.

Preferably, the unwinding tension of the lithium strip is 5-100 N; and the deviation-correcting accuracy of unwinding the pulling-substrate and the lithium strip are both ±0.2 mm.

The application provides a large-width ultra-thin lithium foil prepared by the method according to the above technical solutions;
wherein the width of the lithium foil is 1-600 mm, and the thickness of the lithium foil is 1-20 μm.

The present application provides a battery comprising the large-width ultra-thin lithium foil according to the above technical solutions.

The application provides an asynchronous heating and calendering device for preparing large-width ultra-thin lithium metal foil in a short process, which comprises: a pulling-substrate unwinding unit for unwinding the pulling-substrate; a lithium strip unwinding unit for unwinding the lithium strip; an asynchronous heating and calendering unit which comprises a first calendering roller, a second calendering roller and a heating box, wherein the heating box is used to heat the first calendering roller, the first calendering roller heats the pulling-substrate, and the first calendering roller and the second calendering roller have parallel axes and are arranged opposite to each other, so that the pulling-substrate and the lithium strip are combined into a composite strip; and a winding unit for winding the composite strip. In this device, firstly the substrate is unwound by the pulling-substrate unwinding unit, the lithium strip is unwound by the lithium strip unwinding unit to be preshaped, then they are simultaneously transported to the gap between the first calendering roller and the second calendering roller for combining to obtain a composite strip which is finally wound by a composite strip winding unit. A large-width ultra-thin lithium metal foil with a uniform thickness may be prepared by providing a heating box and asynchronous first calendering roller and second calendering roller in this device, and the lithium foil has a high initial efficiency when it is applied in batteries. The experimental results show that: the width of the lithium foil is 1-600 mm; the thickness of the lithium foil is 1-20 μm; the initial efficiency of the battery is as high as 98%; 150 points in the lateral direction of the lithium strip are used as test points, and the relative error of the effective thickness is 0-3%; 30 points in the longitudinal direction are used as test points, and the relative error of the effective thickness is 0-2%.

BRIEF DESCRIPTION OF THE DRAWINGS

FIG. 1 is a schematic structural diagram of an asynchronous heating and calendering device for preparing a large-width ultra-thin lithium metal foil in a short process according to the present application.

SPECIFIC EMBODIMENTS

The present application provides an asynchronous heating and calendering device for preparing large-width ultra-thin lithium metal foil in a short process, which comprises: a pulling-substrate unwinding unit for unwinding a pulling-substrate;
a lithium strip unwinding unit for unwinding a lithium strip;
a lithium strip pre-shaping unit;
an asynchronous heating and calendering unit which comprises: a first calendering roller, a second calendering roller and a heating box; wherein the heating box is used to heat the first calendering roller; the first calendering roller heats the pulling-substrate, and the first calendering roller and the second calendering roller have parallel axes and are arranged opposite to each other, so that the pulling-substrate and the lithium strip are combined into a composite strip; and
a winding unit for winding the composite strip.

Referring to FIG. 1, FIG. 1 is a schematic structural diagram of an asynchronous heating and calendering device for preparing large-width ultra-thin lithium metal foil in a short process according to the present application, wherein D—lithium strip unwinding unit, E—pulling-substrate unwinding unit, F—lithium strip pre-shaping unit, H—asynchronous heating and calendering unit, G—winding unit.

In the lithium strip unwinding unit (D), 1—lithium strip unwinding roller, 2—first auxiliary guide roller, 3—tension-detecting roller 1, 4—speed-measuring roller;

In the pulling-substrate unwinding unit (E), 8—pulling-substrate unwinding roller, 9—second auxiliary guide roller, 10—first deviation-correcting sensor, 11—third auxiliary guide roller, 12—fourth auxiliary guide roller;

In the lithium strip pre-shaping unit (F), 5—second deviation-correcting sensor, 6—shaping roller 1, 7—shaping roller 2;

In the asynchronous heating and calendering unit (H), A—second calendering roller, B—first calendering roller, and C—heating box;

In the winding unit (G), 13—second tension-detecting roller, 14—third deviation-correcting sensor, 15—composite strip winding roller;

P—pulling-substrate, S—lithium strip, Z—composite strip (i.e., combining the pulling-substrate with the lithium strip).

In order to ensure that the lithium strip does not adhere to the surface of the calendering roller to cause the surface contamination of the calendering roller, the waste of the lithium strip material, and the subsequent influence on the thickness uniformity of the composite strip, in the present application, the surface of the calendering roller which is close to the lithium strip side in the asynchronous heating and calendering unit (i.e., the second calendering roller) is treated by coating, preferably coating with a ceramic layer or a polymer layer. The ceramic layer comprises one or more selected from the group consisting of: alumina, zirconia, chromium oxide and composite ceramic coating; and the polymer layer comprises one or more selected from the group consisting of: polysiloxane, long-chain alkane, and paraffin.

In the present application, the pulling-substrate is preferably selected from the group consisting of: stainless steel foil, copper foil, steel foil and iron foil.

In the present application, the lithium strip unwinding unit comprises: a lithium strip unwinding roller, a first auxiliary guide roller, a first tension-detecting roller and a speed-measuring roller, which are arranged in sequence;

The pulling-substrate unwinding unit comprises: a substrate unwinding roller, a second auxiliary guide roller, a first deviation-correcting sensor, a third auxiliary guide roller and a fourth auxiliary guide roller, which are arranged in sequence;

The lithium strip pre-shaping unit comprises: a second deviation-correcting sensor and shaping rollers arranged oppositely, which are arranged in sequence;

The winding unit comprises: a second tension-detecting roller, a third deviation-correcting sensor and a composite strip winding roller, which are arranged in sequence.

In the present application, with respect to the speed difference between the first calendering roller and the second calendering roller, each of their speeds are respectively set in the asynchronous heating and calendering so that the two are asynchronous, thereby ensuring that when performing the calendering the lithium strip is not only affected by the radial force from the first calendering roller and the second calendering roller, but also affected by the tangential force from the first calendering roller and the second calendering roller, which makes it easier to obtain an ultra-thin lithium strip.

The heating box may heat the first calendering roller to provide heat for calendering and combining the pulling-substrate and the lithium strip, so that the solid lithium metal strip maintains a semi-solid state during calendering, which makes it easier to obtain an ultra-thin lithium strip.

The substrate unwinding unit provides the attachment of the calendered ultra-thin lithium strip and the transported substrate; the lithium strip unwinding mechanism provides and transports the lithium strip to be calendered;

The pre-shaping unit flattens the lithium strip from both sides before the lithium strip enters the asynchronous heating and calendering unit, thereby improving the thickness consistency of the lithium strip and reducing the adverse effect of the thickness fluctuation of the lithium strip on the calendering effect;

The lithium strip pre-shaping mechanism is arranged upstream of the asynchronous heating and calendering unit, and is used to flatten the lithium strip from both sides; after passing through the pre-shaping unit, the lithium strip passes through the gap between the first calendering roller and the second calendering roller in the asynchronous heating and calendering unit.

Particularly, the specific process of using the above asynchronous heating and calendering device comprises:

performing the pre-threading by making the pulling-substrate (P) pass through the substrate unwinding roller (8), the second auxiliary guide roller (9), the first deviation-correcting sensor (10), the third auxiliary guide roller (11), the auxiliary guide roller 4 (12) and the gap between the second calendering roller (A) and the first calendering roller (B), finally fixing the head end of the pulling-substrate (P) on the winding roller (15) and making the pulling-substrate (P) in a tension state; then letting the lithium strip (S) pass through the lithium strip unwinding roller (1), auxiliary guide roller 1 (2), tension-detecting roller 1 (3), speed-measuring roller (4) and the deviation-correcting sensor 2 (5) in the lithium strip pre-shaping mechanism (F), the gap between the shaping roller 1 (6) and the shaping roller 2 (7), and finally pass through the gap between the calendering roller (A) and the heating calendering roller (B); followed by sticking the lithium strip (S) onto the pulling-substrate (P) and keeping the lithium strip in a tension state;

Step 2: adjusting the gap between the rollers
adjust the relative distance between the second calendering roller (A) and the first calendering roller (B), i.e., the thickness of the ultra-thin lithium strip expected to be obtained;

Step 3: heating
heating the second calendering roller (A) and the pulling-substrate (P) by adjusting the temperature of the heating box;

Step 4: adjusting the speed
adjusting the relative speed of the second calendering roller (A) and the first calendering roller (B), applying a tangential force on the calendered lithium strip to cooperate with the heat to obtain an ultra-thin lithium metal.

The present application provides a method for preparing large-width ultra-thin lithium foil by using the asynchronous heating and calendering device according to the above technical solutions, which comprises the following steps:

firstly unwinding and pre-shaping the lithium strip, then asynchronously heating and calendering the lithium strip together with the unwound pulling-substrate in the gap between the first calendering roller and the second calendering roller, finally winding to obtain a composite strip;

the temperature of the above treatment of asynchronous heating and calendering is 50-250° C.; the rotating speed ratio of the second calendering roller and the first calendering roller is 1:1.1-8.

In the present application, the heating box is used to heat the first calendering roller, and then the asynchrony between the first calendering roller and the second calendering roller (i.e., the speed is different) is combined to obtain an ultra-thin lithium strip which has excellent performance, e.g., it may be used to prepare a battery with high initial efficiency.

In the present application, the temperature of the above treatment of asynchronous heating and calendering is 50-250° C.; in a particular embodiment, the temperature of the treatment of asynchronous heating and calendering is 80° C. or 120° C.

The pressure of the treatment of the asynchronous heating and calendering is preferably 3-6 T; in a particular embodiment, the pressure of the treatment of the asynchronous heating and calendering is 4 T or 5 T.

The rotating speed ratio of the first calendering roller and the second calendering roller is 1:1.1-8. The speed of the first calendering roller is preferably 1-5 m/min, and the speed of the second calendering roller is preferably 1-10 m/min. In a particular embodiment, the speed of the first calendering roller is 3 m/min; the speed of the second calendering roller is 1.5 m/min or 2 m/min.

In the present application, the unwinding speed of the lithium strip is 0.1-3 m/min; the unwinding speed of the pulling-substrate is 0.1-20 m/min. The tension of the lithium strip during unwinding is 5-100 N; the deviation-correcting accuracy of the pulling-substrate and the lithium strip during unwinding are both preferably ±0.2 mm.

The application provides a large-width ultra-thin lithium foil, which is prepared by the method according to the above technical solutions;

the width of the lithium foil is 1-600 mm; and the thickness of the lithium foil is 1-20 μm.

The width of the lithium foil is preferably 80-100 mm.

The present application provides a battery comprising the large-width ultra-thin lithium foil according to the above technical solutions.

In the present application, the SiOC electrode plate is pre-lithiated with the above ultra-thin lithium foil, and is assembled with the NCA to form a battery.

The battery made of the large-width ultra-thin lithium foil according to the above technical solutions has a relatively high initial coulombic efficiency, i.e., the initial efficiency.

In order to further illustrate the present application, an asynchronous heating and calendering device, a large-width ultra-thin lithium metal foil and a preparation method and use thereof according to the present application will be described in detail below with reference to the following Examples, but they should not be construed to limit the protection scope of the present application.

Example 1

The pre-threading is performed by making the pulling-substrate (P) pass through the substrate unwinding roller (8), the second auxiliary guide roller (9), the first deviation-correcting sensor (10), the third auxiliary guide roller (11), the auxiliary guide roller 4 (12) and the gap between the second calendering roller (A) and the first calendering roller (B), finally fixing the head end of the pulling-substrate (P) on the winding roller (15) and making the pulling-substrate (P) in a tension state; then letting the lithium strip (S) pass through the lithium strip unwinding roller (1), auxiliary guide roller 1 (2), tension-detecting roller 1 (3), speed-measuring roller (4) and the deviation-correcting sensor 2 (5) in the lithium strip pre-shaping mechanism (F), the gap between the shaping roller 1 (6) and the shaping roller 2 (7), and finally pass through the gap between the calendering roller (A) and the heating calendering roller (B); followed by sticking the lithium strip (S) onto the pulling-substrate (P) and keeping the lithium strip in a tension state;

wherein the pulling-substrate (P) is 10 μm copper foil, after the pre-threading of the strip is completed, adjusting the relative distance between the calendering roller (A) and the calendering roller (B) to 11 μm, adjusting the temperature of the heating box to 120° C., heating the calendering roller B; adjusting the speed of the calendering roller (A) to 1.5 m/min, the speed of the calendering roller (B) to 3 m/min, and the pressure between the calendering rollers to 5 T, finally a composite strip (Z) with a thickness of 20 μm and a width of 80 mm is obtained through the continuous winding of the winding unit (G), wherein the effective thickness of the lithium strip is 10 μm.

In the present application, the SiOC electrode plate is pre-lithiated with the ultra-thin lithium foil prepared in Example 1, and is assembled with the NCA to form a battery. The test results are: the initial coulombic efficiency is 98%. The initial efficiency of the non-pre-lithiated SiOC-NCA battery is only 76%.

A 50 cm lithium strip in the middle part is randomly selected, taking a point about every 1 cm in the lateral direction to measure the thickness, particularly measuring the thickness of the two sides and the middle of the lithium strip, 150 points in total; taking a point every 1 cm in the longitudinal direction to measure the thickness, particularly measuring the thickness of the two sides and the middle of the lithium strip, 24 points in total.

TABLE 1

The test results of the effective thickness of different points in the lateral direction of the lithium strip prepared in Example 1 of the present application

| No. | Thickness of the upper part (μm) | Relative error (%) | Thickness of the middle part (μm) | Relative error (%) | Thickness of the lower part (μm) | Relative error (%) |
|---|---|---|---|---|---|---|
| 1 | 10.1 | 1% | 10.2 | 2% | 10.2 | 2% |
| 2 | 10.2 | 2% | 10.3 | 3% | 10.3 | 3% |
| 3 | 10.2 | 2% | 10.2 | 2% | 10.2 | 2% |
| 4 | 10.3 | 3% | 10.2 | 2% | 10.2 | 2% |
| 5 | 10.3 | 3% | 10.2 | 2% | 10.3 | 3% |
| 6 | 10.3 | 3% | 10.3 | 3% | 10.2 | 2% |
| 7 | 10.2 | 2% | 10.3 | 3% | 10.2 | 2% |
| 8 | 9.9 | 1% | 10.2 | 2% | 10.3 | 3% |
| 9 | 9.9 | 1% | 9.8 | 2% | 10.2 | 2% |
| 10 | 10.2 | 2% | 9.8 | 2% | 9.9 | 1% |
| 11 | 10.2 | 2% | 10 | 0 | 9.8 | 2% |
| 12 | 10.2 | 2% | 10 | 0 | 9.9 | 1% |
| 13 | 9.8 | 2% | 10.1 | 1% | 10.2 | 2% |
| 14 | 9.9 | 1% | 10.2 | 2% | 10.1 | 1% |
| 15 | 10.2 | 2% | 10.3 | 3% | 10.1 | 1% |
| 16 | 10.3 | 3% | 10.2 | 2% | 10.1 | 1% |
| 17 | 10.3 | 3% | 10.3 | 3% | 10.3 | 3% |
| 18 | 10.4 | 4% | 10.1 | 1% | 10.2 | 2% |
| 19 | 10.4 | 4% | 9.8 | 2% | 10.2 | 2% |
| 20 | 10.4 | 4% | 9.8 | 2% | 10.2 | 2% |
| 21 | 10.4 | 4% | 10.3 | 3% | 10.1 | 1% |
| 22 | 10.2 | 2% | 10.3 | 3% | 10 | 0 |
| 23 | 10.2 | 2% | 10.2 | 2% | 10 | 0 |
| 24 | 10.2 | 2% | 10.2 | 2% | 10.2 | 2% |
| 25 | 10.3 | 3% | 10.3 | 3% | 10.1 | 1% |
| 26 | 10.3 | 3% | 10.3 | 3% | 10.3 | 3% |
| 27 | 9.8 | 2% | 10.3 | 3% | 10.2 | 2% |
| 28 | 9.9 | 1% | 10.2 | 2% | 10.2 | 2% |
| 29 | 9.8 | 2% | 9.8 | 2% | 10.1 | 1% |
| 30 | 10 | 0 | 9.8 | 2% | 10.3 | 3% |
| 31 | 10 | 0 | 10.1 | 1% | 9.9 | 1% |
| 32 | 10.1 | 1% | 10.3 | 3% | 9.8 | 2% |
| 33 | 10 | 0 | 10.2 | 2% | 9.8 | 2% |
| 34 | 10 | 0 | 10.1 | 1% | 10 | 0 |
| 35 | 10 | 0 | 10.2 | 2% | 10.3 | 3% |
| 36 | 10.2 | 2% | 10.2 | 2% | 10.1 | 1% |
| 37 | 10.3 | 3% | 10.2 | 2% | 10.1 | 1% |
| 38 | 10.3 | 3% | 10.3 | 3% | 10.2 | 2% |
| 39 | 10.2 | 2% | 10.1 | 1% | 10.3 | 3% |
| 40 | 10.2 | 2% | 10.2 | 2% | 10.2 | 2% |
| 41 | 10.2 | 2% | 10.1 | 1% | 10.1 | 1% |
| 42 | 10.1 | 1% | 10.2 | 2% | 10.2 | 2% |
| 43 | 10.2 | 2% | 10.1 | 1% | 10.1 | 1% |
| 44 | 10.3 | 3% | 10.2 | 2% | 10.2 | 2% |
| 45 | 10.2 | 2% | 10.2 | 2% | 10.3 | 3% |
| 46 | 10.2 | 2% | 10.3 | 3% | 10.2 | 2% |
| 47 | 10.1 | 1% | 10.1 | 1% | 10.1 | 1% |
| 48 | 10.1 | 1% | 10.2 | 2% | 10.1 | 1% |
| 49 | 10.1 | 1% | 10.2 | 2% | 10.1 | 1% |
| 50 | 10.2 | 2% | 10.2 | 2% | 10.1 | 1% |

TABLE 2

The test results of the effective thickness of different points in the longitudinal direction of the lithium strip prepared in Example 1 of the present application

| No. | Thickness of the upper part (μm) | Relative error (%) | Thickness of the middle part (μm) | Relative error (%) | Thickness of the lower part (μm) | Relative error (%) |
|---|---|---|---|---|---|---|
| 1 | 10.2 | 2% | 10.2 | 2% | 10.1 | 1% |
| 2 | 10.3 | 3% | 10.1 | 1% | 10.2 | 2% |
| 3 | 10.2 | 2% | 9.9 | 1% | 10.2 | 2% |
| 4 | 10.1 | 1% | 10.3 | 3% | 10.2 | 2% |
| 5 | 9.8 | 2% | 10.1 | 1% | 10.1 | 1% |
| 6 | 10.2 | 2% | 10.2 | 2% | 9.9 | 1% |

TABLE 2-continued

The test results of the effective thickness of different points in the longitudinal direction of the lithium strip prepared in Example 1 of the present application

| No. | Thickness of the upper part (μm) | Relative error (%) | Thickness of the middle part (μm) | Relative error (%) | Thickness of the lower part (μm) | Relative error (%) |
|---|---|---|---|---|---|---|
| 7 | 10 | 0 | 10.1 | 1% | 10.2 | 2% |
| 8 | 10.1 | 1% | 10.2 | 2% | 10.2 | 2% |

Example 2

The pre-threading is performed by making the pulling-substrate (P) pass through the substrate unwinding roller (8), the second auxiliary guide roller (9), the first deviation-correcting sensor (10), the third auxiliary guide roller (11), the auxiliary guide roller 4 (12) and the gap between the second calendering roller (A) and the first calendering roller (B), finally fixing the head end of the pulling-substrate (P) on the winding roller (15) and making the pulling-substrate (P) in a tension state; then letting the lithium strip (S) pass through the lithium strip unwinding roller (1), auxiliary guide roller 1 (2), tension-detecting roller 1 (3), speed-measuring roller (4) and the deviation-correcting sensor 2 (5) in the lithium strip pre-shaping mechanism (F), the gap between the shaping roller 1 (6) and the shaping roller 2 (7), and finally pass through the gap between the calendering roller (A) and the heating calendering roller (B); followed by sticking the lithium strip (S) onto the pulling-substrate (P) and keeping the lithium strip in a tension state;

wherein the pulling-substrate (P) is 10 μm stainless steel foil, after the pre-threading of the strip is completed, adjusting the relative distance between the calendering roller (A) and the calendering roller (B) to 22 μm, adjusting the temperature of the heating box to 80° C., heating the calendering roller B; adjusting the speed of the calendering roller (A) to 2 m/min, the speed of the calendering roller (B) to 3 m/min, and the pressure between the calendering rollers to 4 T, finally a composite strip (Z) with a thickness of 30 μm and a width of 100 mm is obtained through the continuous winding of the winding unit (G), wherein the effective thickness of the lithium strip is 20 μm.

In the present application, the SiOC electrode plate is pre-lithiated with the ultra-thin lithium foil prepared in Example 2, and is assembled with the NCA to form a battery. The test results are: the initial coulombic efficiency is 98%.

A 50 cm lithium strip in the middle part is randomly selected, taking a point about every 1 cm in the lateral direction to measure the thickness, particularly measuring the thickness of the two sides and the middle of the lithium strip, 150 points in total; taking a point every 1 cm in the longitudinal direction to measure the thickness, particularly measuring the thickness of the two sides and the middle of the lithium strip, 30 points in total.

TABLE 3

The test results of the effective thickness of different points in the lateral direction of the lithium strip prepared in Example 2 of the present application

| No. | Thickness of the upper part (μm) | Relative error (%) | Thickness of the middle part (μm) | Relative error (%) | Thickness of the lower part (μm) | Relative error (%) |
|---|---|---|---|---|---|---|
| 1 | 20.1 | 0.5% | 20.2 | 1% | 20.1 | 0.5% |
| 2 | 20.1 | 0.5% | 20.1 | 0.5% | 20.2 | 1% |
| 3 | 20.2 | 1% | 20.1 | 0.5% | 20.2 | 1% |
| 4 | 20.2 | 1% | 20.1 | 0.5% | 20.1 | 0.5% |
| 5 | 20.2 | 1% | 20.2 | 1% | 19.9 | 0.5% |
| 6 | 20.3 | 1.5% | 20.1 | 0.5% | 19.9 | 0.5% |
| 7 | 20.3 | 1.5% | 20 | 0 | 20.1 | 0.5% |
| 8 | 20.3 | 1.5% | 20.2 | 1% | 19.9 | 0.5% |
| 9 | 20.3 | 1.5% | 20 | 0 | 19.8 | 1% |
| 10 | 20.2 | 1% | 20 | 0 | 19.9 | 0.5% |
| 11 | 20.2 | 1% | 20.1 | 0.5% | 19.9 | 0.5% |
| 12 | 20.2 | 1% | 20.2 | 1% | 20 | 0 |
| 13 | 20.1 | 0.5% | 20 | 0 | 20 | 0 |
| 14 | 19.9 | 0.5% | 20.1 | 0.5% | 20.1 | 0.5% |
| 15 | 20.1 | 0.5% | 20.2 | 1% | 20.1 | 0.5% |
| 16 | 19.9 | 0.5% | 20.1 | 0.5% | 20.2 | 1% |
| 17 | 19.9 | 0.5% | 20.2 | 1% | 20.1 | 0.5% |
| 18 | 20.2 | 1% | 20.2 | 1% | 20.1 | 0.5% |
| 19 | 20.2 | 1% | 20.2 | 1% | 20.2 | 1% |
| 20 | 20.2 | 1% | 19.8 | 1% | 20.2 | 1% |
| 21 | 20.1 | 0.5% | 19.9 | 0.5% | 20.1 | 0.5% |
| 22 | 20.1 | 0.5% | 20.1 | 0.5% | 20.2 | 1% |
| 23 | 20 | 0 | 19.9 | 0.5% | 20.1 | 0.5% |
| 24 | 20.1 | 0.5% | 20 | 0% | 19.9 | 0.5% |
| 25 | 20.2 | 1% | 20.1 | 0.5% | 19.9 | 0.5% |
| 26 | 20 | 0 | 20.2 | 1% | 20.1 | 0.5% |
| 27 | 20.1 | 0.5% | 20.2 | 1% | 20.1 | 0.5% |
| 28 | 20.2 | 1% | 20.1 | 0.5% | 20.1 | 0.5% |
| 29 | 20.2 | 1% | 20.1 | 0.5% | 20.2 | 1% |
| 30 | 20.1 | 0.5% | 20 | 0 | 20.2 | 1% |
| 31 | 20 | 0 | 20.1 | 0.5% | 20.1 | 0.5% |
| 32 | 20 | 0 | 20 | 0 | 20.1 | 0.5% |
| 33 | 20.2 | 1% | 19.9 | 0.5% | 20.1 | 0.5% |
| 34 | 20.1 | 0.5% | 19.9 | 0.5% | 20.2 | 1% |
| 35 | 20.1 | 0.5% | 20.1 | 0.5% | 20.2 | 1% |
| 36 | 20.1 | 0.5% | 19.9 | 0.5% | 20.2 | 1% |
| 37 | 20.2 | 1% | 20.1 | 0.5% | 20.3 | 1.5% |
| 38 | 20 | 0 | 20.1 | 0.5% | 20.3 | 1.5% |
| 39 | 20 | 0 | 20.1 | 0.5% | 20.3 | 1.5% |
| 40 | 19.9 | 0.5% | 20 | 0 | 20.2 | 1% |
| 41 | 19.9 | 0.5% | 20.1 | 0.5% | 20.2 | 1% |
| 42 | 20.1 | 0.5% | 20.1 | 0.5% | 20.1 | 0.5% |
| 43 | 20 | 0 | 20.2 | 1% | 20.1 | 0.5% |
| 44 | 20 | 0 | 20.2 | 1% | 19.9 | 0.5% |
| 45 | 20.2 | 1% | 20.1 | 0.5% | 19.9 | 0.5% |
| 46 | 20 | 0 | 19.9 | 0.5% | 20 | 0 |
| 47 | 20.2 | 1% | 19.9 | 0.5% | 20.1 | 0.5% |
| 48 | 20.1 | 0.5% | 19.8 | 1% | 20.1 | 0.5% |
| 49 | 20.2 | 1% | 20 | 0 | 20.2 | 1% |
| 50 | 20 | 0 | 20.1 | 0.5% | 20.2 | 1% |

TABLE 4

The test results of the effective thickness of different points in the longitudinal direction of the lithium strip prepared in Example 2 of the present application

| No. | Thickness of the upper part (μm) | Relative error (%) | Thickness of the middle part (μm) | Relative error (%) | Thickness of the lower part (μm) | Relative error (%) |
|---|---|---|---|---|---|---|
| 1 | 20.1 | 0.5% | 20.1 | 0.5% | 20.1 | 0.5% |
| 2 | 20.1 | 0.5% | 20.1 | 0.5% | 20.1 | 0.5% |
| 3 | 20.2 | 1% | 20 | 0 | 19.9 | 0.5% |
| 4 | 20.2 | 1% | 19.9 | 0.5% | 20 | 0 |

TABLE 4-continued

The test results of the effective thickness of different points in the longitudinal direction of the lithium strip prepared in Example 2 of the present application

| No. | Thickness of the upper part (μm) | Relative error (%) | Thickness of the middle part (μm) | Relative error (%) | Thickness of the lower part (μm) | Relative error (%) |
| --- | --- | --- | --- | --- | --- | --- |
| 5 | 20.2 | 1% | 19.9 | 0.5% | 19.9 | 0.5% |
| 6 | 20.1 | 0.5% | 20 | 0 | 20 | 0 |
| 7 | 20 | 0 | 20.1 | 0.5% | 20.1 | 0.5% |
| 8 | 20.1 | 0.5% | 20.1 | 0.5% | 20.1 | 0.5% |
| 9 | 20.1 | 0.5% | 20 | 0 | 20 | 0 |
| 10 | 20 | 0 | 20.1 | 0.5% | 20.1 | 0.5% |

As can be seen from the above Examples, the present application provides an asynchronous heating and calendering device for preparing large-width ultra-thin lithium metal foil in a short process, which comprises: a pulling-substrate unwinding unit for unwinding the pulling-substrate; a lithium strip unwinding unit for unwinding the lithium strip; an asynchronous heating and calendering unit which comprises a first calendering roller, a second calendering roller and a heating box, wherein the heating box is used to heat the first calendering roller, the first calendering roller heats the pulling-substrate, and the first calendering roller and the second calendering roller have parallel axes and are arranged opposite to each other, so that the pulling-substrate and the lithium strip are combined into a composite strip; and a winding unit for winding the composite strip. A large-width ultra-thin lithium metal foil with a uniform thickness may be prepared by providing a heating box and asynchronous first calendering roller and second calendering roller in this device, and the lithium foil has a high initial efficiency when it is applied in batteries. The experimental results show that: the width of the lithium foil is 1-600 mm; the thickness of the lithium foil is 1-20 μm; the initial efficiency of the battery is as high as 98%; 150 points in the lateral direction of the lithium strip are used as test points, and the relative error of the effective thickness is 0-3%; 30 points in the longitudinal direction are used as test points, and the relative error of the effective thickness is 0-2%.

The above are only the preferred embodiments of the present application. It should be pointed out that for those skilled in the art, without departing from the principles of the present application, several improvements and modifications may be made and they should be regarded as falling within the protection scope of the present application.

The invention claimed is:

1. An asynchronous heating and calendering device for preparing large-width ultra-thin lithium metal foil in a short process, which comprises:
   a pulling-substrate unwinding unit for unwinding a pulling-substrate;
   a lithium strip unwinding unit for unwinding a lithium strip;
   a lithium strip pre-shaping unit;
   an asynchronous heating and calendering unit which comprises: a first calendering roller, a second calendering roller and a heating box; wherein the pulling-substrate unwinding unit, the lithium strip pre-shaping unit and the asynchronous heating and calendering unit are configured to enable the pulling-substrate to be located on the side of the first calendering roller and the lithium strip to be located on the side of the second calendering roller during calendering; the heating box is used to heat the first calendering roller and does not heat the second calendering roller; the first calendering roller heats the pulling-substrate, and the first calendering roller and the second calendering roller have parallel axes and are arranged opposite to each other, so that the pulling-substrate and the lithium strip are combined into a composite strip; the asynchronous heating and calendering unit can provide a pressure of 3-6 T; the first calendering roller can rotate at a speed of 1-5 m/min, the second calendering roller can rotate at a speed of 1-10 m/min, and the first calendering roller and the second calendering roller can rotate at a speed ratio of 1:1.1-8; and
   a winding unit for winding the composite strip;
   wherein the lithium strip unwinding unit comprises: a lithium strip unwinding roller, a first auxiliary guide roller, a first tension-detecting roller and a speed-measuring roller, which are arranged in sequence;
   wherein the pulling-substrate unwinding unit comprises: a substrate unwinding roller, a second auxiliary guide roller, a first deviation-correcting sensor, a third auxiliary guide roller and a fourth auxiliary guide roller, which are arranged in sequence;
   wherein the lithium strip pre-shaping unit comprises: a second deviation-correcting sensor and shaping rollers arranged oppositely, which are arranged in sequence; and
   wherein the winding unit comprises: a second tension-detecting roller, a third deviation-correcting sensor and a composite strip winding roller, which are arranged in sequence.

2. The asynchronous heating and calendering device according to claim 1, wherein the surface of the second calendering roller is coated with a ceramic layer or a polymer layer; wherein the ceramic layer comprises one or more selected from the group consisting of: alumina, zirconia, chromium oxide and composite ceramic coating; and the polymer layer comprises one or more selected from the group consisting of: polysiloxane, long-chain alkane, and paraffin.

3. The asynchronous heating and calendering device according to claim 1, wherein the pulling-substrate is selected from the group consisting of: stainless steel foil, copper foil, steel foil and iron foil.

4. A method for preparing large-width ultra-thin lithium foil by using the asynchronous heating and calendering device according to claim 1, which comprises the following steps:
   firstly unwinding and pre-shaping the lithium strip, then asynchronously heating and calendering the lithium strip together with the unwound pulling-substrate in the gap between the first calendering roller and the second calendering roller, finally winding to obtain the composite strip;
   the temperature of the above treatment of asynchronous heating and calendering is 50-250° C.; the rotating speed ratio of the second calendering roller and the first calendering roller is 1:1.1-8.

5. The method according to claim 4, wherein the unwinding speed of the lithium strip is 0.1-3 m/min; and the unwinding speed of the pulling-substrate is 0.1-20 m/min.

6. The method according to claim 4, wherein the unwinding tension of the lithium strip is 5-100 N; and the deviation-correcting accuracy of unwinding the pulling-substrate and the lithium strip are both ±0.2 mm.

* * * * *